United States Patent
McDonough et al.

(10) Patent No.: US 6,714,982 B1
(45) Date of Patent: Mar. 30, 2004

(54) MESSAGE PASSING OVER SECURE CONNECTIONS USING A NETWORK SERVER

(75) Inventors: John C. McDonough, Braintree, MA (US); Suzanne K. McDonough, Harvard, MA (US); Erin D. O'Brien, Acton, MA (US)

(73) Assignee: FMR Corp., Boston, MA (US)

(*) Notice: Subject to any disclaimer, the term of this patent is extended or adjusted under 35 U.S.C. 154(b) by 0 days.

(21) Appl. No.: 09/487,958

(22) Filed: Jan. 19, 2000

(51) Int. Cl.[7] .............................................. G06F 15/16
(52) U.S. Cl. ..................... 709/228; 709/203; 709/217; 709/218; 709/227; 713/150; 713/155; 713/200; 713/201; 705/64
(58) Field of Search ................................. 709/200–203, 709/206–207, 217–219, 227–229; 713/150–151, 155–156, 200–202; 705/64–67

(56) References Cited

U.S. PATENT DOCUMENTS

| | | | |
|---|---|---|---|
| 5,778,174 A | * 7/1998 | Cain | 713/201 |
| 5,790,790 A | 8/1998 | Smith et al. | 709/206 |
| 5,805,803 A | * 9/1998 | Birrell et al. | 709/228 |
| 5,848,161 A | * 12/1998 | Luneau et al. | 713/151 |
| 5,862,339 A | * 1/1999 | Bonnaure et al. | 709/227 |
| 5,884,312 A | 3/1999 | Dustan et al. | 707/10 |
| 5,896,499 A | * 4/1999 | McKelvey | 713/201 |
| 5,915,087 A | * 6/1999 | Hammond et al. | 713/201 |
| 5,922,074 A | 7/1999 | Richard et al. | 713/200 |
| 5,935,212 A | 8/1999 | Kalajan et al. | 709/228 |
| 5,978,140 A | 11/1999 | Maruyama | 359/569 |
| 5,987,517 A | 11/1999 | Firth et al. | 709/230 |
| 6,014,688 A | 1/2000 | Venkatraman et al. | 709/208 |
| 6,081,900 A | * 6/2000 | Subramaniam et al. | 713/201 |
| 6,161,137 A | * 12/2000 | Ogdon et al. | 709/224 |
| 6,275,941 B1 | * 8/2001 | Saito et al. | 713/201 |
| 6,477,647 B1 | 11/2002 | Venkatraman et al. | 713/193 |
| 6,643,701 B1 | * 11/2003 | Aziz et al. | 709/227 |

FOREIGN PATENT DOCUMENTS

| | | |
|---|---|---|
| EP | 0862105 A2 | 9/1998 |
| EP | 0869657 A1 | 10/1998 |
| EP | 0886227 A1 | 12/1998 |
| EP | 0886228 A2 | 12/1998 |
| EP | 0907120 A2 | 4/1999 |
| EP | 0942568 A2 | 9/1999 |
| EP | 0954146 A2 | 11/1999 |
| EP | 0954147 A2 | 11/1999 |
| WO | WO 98/05011 | 2/1998 |
| WO | WO 99/40527 | 8/1999 |
| WO | WO 00/02348 | 1/2000 |

OTHER PUBLICATIONS

WebSafe E–Mail Provides Secure Remote Access to Corporate Email, Sep. 23, 1998.
Internet Security Advantages, Inc., Introduces WebSafe E–mail, (the publication date is unknown after investigation).

* cited by examiner

*Primary Examiner*—Bharat Barot
(74) *Attorney, Agent, or Firm*—Fish & Richardson P.C.

(57) ABSTRACT

Techniques for securely providing network services such as e-mail, chat, instant messaging, and e-commerce. Techniques can include establishing a first secure network connection through a publicly accessible network between a network server and a sender, through which a message is received. They can also include establishing a second secure network connection through a publicly accessible network between the network server and a recipient, thorough which the received message is forwarded. They can also include determining whether the recipient has an associated account on the network server.

14 Claims, 12 Drawing Sheets

URL: http://www.tradecircles.com/cgibin/findtradingpartner?user=Jim's+Software+Consultants Search For Trading Partners Select one or more trading groups:

☐ ZIP CODES
☐ INDUSTRY
☒ FORTUNE 500

210

Results
1. <u>IBM</u>
2. <u>INTEL</u>
3. <u>ALPHA-THETA</u>

| | Trade Circle Profile Setup | |
|---|---|---|
| Trade Circle Group: | Domain 1: | Domain 2: |
| ELECTRONICS | WORLD WIDE | AUTOMOTIVE |
| Trade Circle Group 2: | Address: | City/State: |
| AUTOMOTIVE | 65 WALKER WAY | DETROIT, MI. |
| Name: | Zip: | |
| MARY SMITH | 06154 | |
| Company: | | |
| FORD MOTOR CORPORATION | | |
| E-Mail: | | |
| MARY SMITH @FM.COM | | |
| Login ID: | | |
| msm1654 | | |
| Password: | | |
| ******** | | |

Additional access:

☐ Secure e-mail

☐ Communications through Palm V

☐ B2B bill payment

☐ Mailing list:
    DVD Updates
    Ford Financials

*FIG. 11*

MESSAGE PASSING OVER SECURE CONNECTIONS USING A NETWORK SERVER

BACKGROUND

Computer networks enable widely separated users to exchange electronic messages. Many networks, such as the Internet, depend on the cooperation of differently owned network computers to pass messages along to their destination. Unfortunately, this approach can raise security concerns because each computer handling a message can, potentially, examine the message's contents.

A variety of different security techniques enable users to "scramble" (i.e., encrypt) a message before it travels over the network and "unscramble" (i.e., decrypt) the message when it finally reaches its destination. For example, a user concerned about e-mail security can install PGP (Pretty Good Privacy) encryption/decryption software. PGP provides a number of tools that enable users to manage security data (e.g., keys) used by the system. Often security systems can require a substantial investment in time or money for software installation, maintenance, and/or user training.

SUMMARY

In general, in one aspect, the invention features a method of handling a message sent from a sender to a recipient via a network server. The method includes receiving a message from the sender over a secure network connection, determining whether the message is addressed to a recipient having an account on the network server, and forwarding the message to the recipient over an unsecured network connection if the user does not have an account on the server.

Embodiments may include one or more of the following features. The secure connection may be a secure sockets layer connection. The message may be sent using a type of HTTP (HyperText Transfer Protocol) such as HTTPS (HyperText Transfer Protocol Secure). The message may be an HTML (HyperText Markup Language) message. The network may be the Internet.

In general, in another aspect, the invention features a computer program product, disposed on a computer readable medium, for handling a message sent from a sender to a recipient via a network server. The computer program includes instructions for causing a server to receive a message from the sender over a secure network connection, determine whether the message is addressed to a recipient having an account on the network server, and forward the message to the recipient over an unsecured network connection if the user does not have an account on the server.

In general, in another aspect, the invention features a method of instant messaging between a sender and a recipient via a server. The method includes establishing a first secure network connection between the server and the sender, establishing a second secure network connection between the server and the recipient, receiving an instant message from the sender over the first secure network connection, and forwarding the instant message to the recipient over the second secure network connection.

In general, in another aspect, the invention features a computer program, disposed on a computer readable medium, for handing instant messaging between a sender and a receiver. The computer program includes instructions for causing a server to establish a first secure network connection between the server and the sender, establish a second secure network connection between the server and the receiver, receive an instant message over the first secure network connection, and forward the instant message over the second secure network connection.

In general, in another aspect, the invention features a method of providing communication between first, second, and third network user clients via a network server. The method includes establishing a first secure network connection between the server and the first network user client, establishing a second secure network connection between the server and the second network user client, establishing a third secure network connection between the server and the third network user client, receiving a message over the first secure network connection, and forwarding the message over the second and third secure network connections.

Embodiments may include one or more of the following features. The first, second, and third secure network connections may be secure sockets layer connections. The first, second, and third network users may be chat room participants.

In general, in another aspect, the invention features a computer program, disposed on a computer readable medium, for providing communication between first, second, and third network user web-browsers. The computer program may include instructions for causing a server to establish a first secure network connection between the server and the first network user web-browser, establish a second secure network connection between the server and the second network user web-browser, establish a third secure network connection between the server and the third network user web-browser, receive a message over the first secure network connection, and forward the message over the second and third secure network connections.

In general, in another aspect, the invention features a method of e-commerce between network users having respective accounts on a network server. The method includes enabling the network users to use their accounts to place electronic orders over secure network connections, determining the net debits or credits over a period of time for one or more of the network user accounts, and billing the network users having accounts determined to have a net debit.

Embodiments may include one or more of the following features. The period of time may be a billing cycle. The billing may include automatically charging a credit card associated with an account having a net debit. The method may further include crediting network users determined to have a net credit.

In general, in another aspect, the invention features a method of e-commerce. The method includes receiving information describing characteristics of one or more network vendors, defining groups of network vendors based on the received information, receiving a message identifying one or more of the defined groups, based on the identified groups, determining one or more network vendors, and enabling a user to electronically purchase an item from one of the listed network vendors.

Embodiments may include one or more of the following features. The characteristics may include vendor size, vendor location, and vendor industry. The determining may include selecting network vendors in each of the identified groups.

Advantages of the invention will become apparent in view of the following description, including the figures, and the claims.

BRIEF DESCRIPTION OF THE DRAWINGS

FIG. 9 is a screenshot of a dialog for finding vendors.

FIG. 11 is a screenshot of a dialog for entering a user profile.

DETAILED DESCRIPTION

Figure 1:
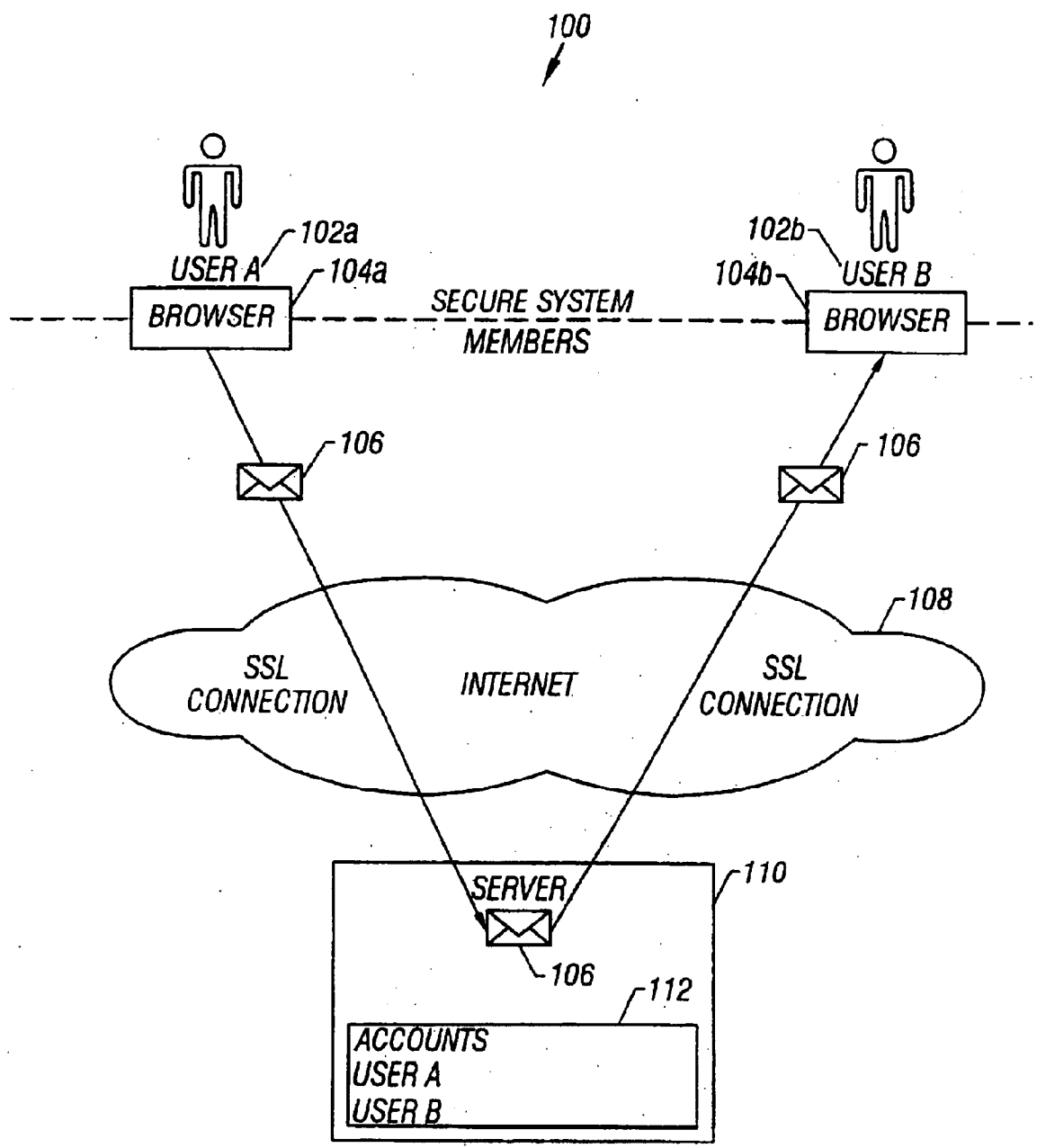
FIGS. 1–3 are diagrams of a system for securely handling messages.

FIG. 1 shows a system 100 that enables users 102a, 102b of familiar web-browsers 104a, 104b (e.g., Microsoft's® Internet Explorer®, Netscape's® Navigator, Opera, Mozilla, and other HTTP (HyperText Transfer Protocol) clients) to securely exchange messages 106 over a network 108. The system 100 takes advantage of features offered by many web-browsers to provide security with little, if any, user configuration or maintenance.

Messages 106 between users 102a, 102b take a two-part journey: from the source 104a to a server 110, then from the server 110 to the destination 104b. Each leg features a SSL (Secure Socket Layer) connection between server 110 and web-browser 104a, 104b. The SSL connections handle encryption of the message 106 before it travels across the network 108 and decryption at the end of each leg.

SSL is a network layer protocol that currently supports 128-bit encryption for United States version browsers. A type of HTTP known as HTTPS engages SSL to secure web-browser communication with a web-server. Though the U.S. government restricts export of ciphers that support 128-bit SSL, the server 110 can include a Global Server ID (not shown) that enables international browsers to "step up" to more powerful SSL encryption.

The system 100 uses the concept of user accounts to identify message senders and recipients. To securely send or receive messages 106, a user 102a can log-on to a system 100 account, for example, by navigating a browser to the server's 110 URL (Universal Resource Locator) (e.g., www.server.com) and entering a user name and password in an HTML (HyperText Markup Language) form. Accounts enable users to receive messages at different clients (e.g., at home and office computers).

After the user has logged on and prepared a message (e.g., in a browser window text field), the server 110 can establish an SSL connection with the user's browser 104a for secure transmission of the message 106. The server 110 may store the message 106 in a mailbox for the intended recipient 102b. When the recipient 102b logs onto the system 100, the server 110 establishes an SSL connection between the server 110 and recipient's browser 104b. The server 110 can present a directory of messages in the users mailbox and, in response to user selection, securely deliver the message 106.

Each message 106 may be encoded as HTML. This enables the message to include formatting, colors, animation, sounds, and other elements familiar to web-pages such as instructions for JavaScript, Applets, and/or ActiveX controls.

FIG. 1 illustrated communication between two logged-on system users 102a, 102b. Users 102a, 102b, however, usually do not remain logged-on indefinitely. That is, the users may visit other web-sites or turn off their computers entirely. Thus, the server 110 may store a message 106 for some time before delivering the message 106 to the recipient. To reduce the time between message 106 transmission to the server 110 and the message's 106 ultimate delivery to the recipient, the system 100 can use a variety of notification mechanisms to alert system 100 users of waiting messages 106.

Figure 2:
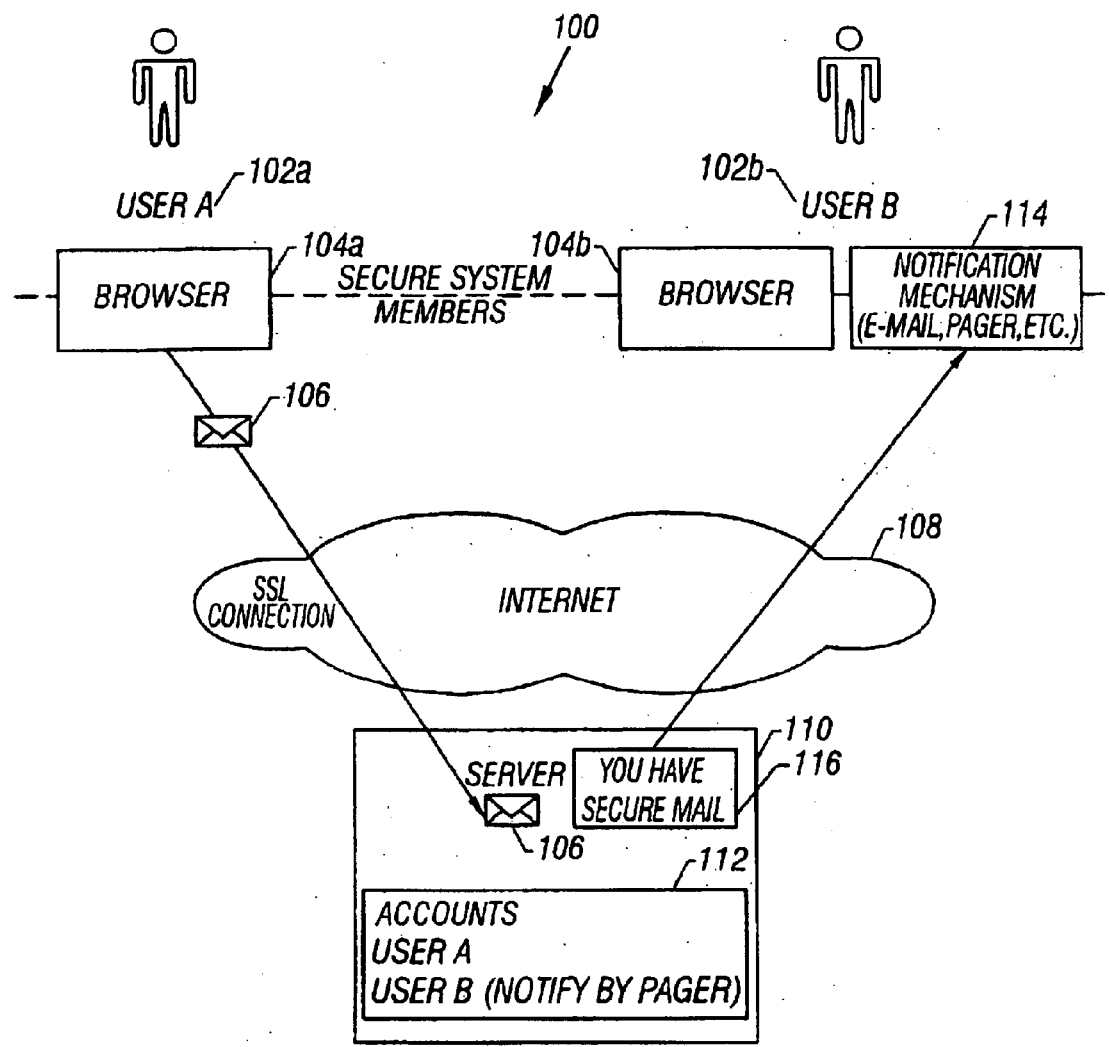

As shown in FIG. 2, the server 110 can store 112 information describing how to notify a user of messages. For example, a user may designate a pager 114, cellular device, another e-mail account, and so forth for receipt of notification messages. As shown, the server 110 transmits a notification message 116 (e.g., "you have secure mail") to a user's 102b pager 114, for example, by sending the message to a pager-forwarding web-site (e.g., www.pager.com/forward.bin? number=555-1212&message=you+have+secure+mail"). After seeing the pager 114 display of the message 116, the user 102b can log-on and securely retrieve waiting messages.

Figure 3:
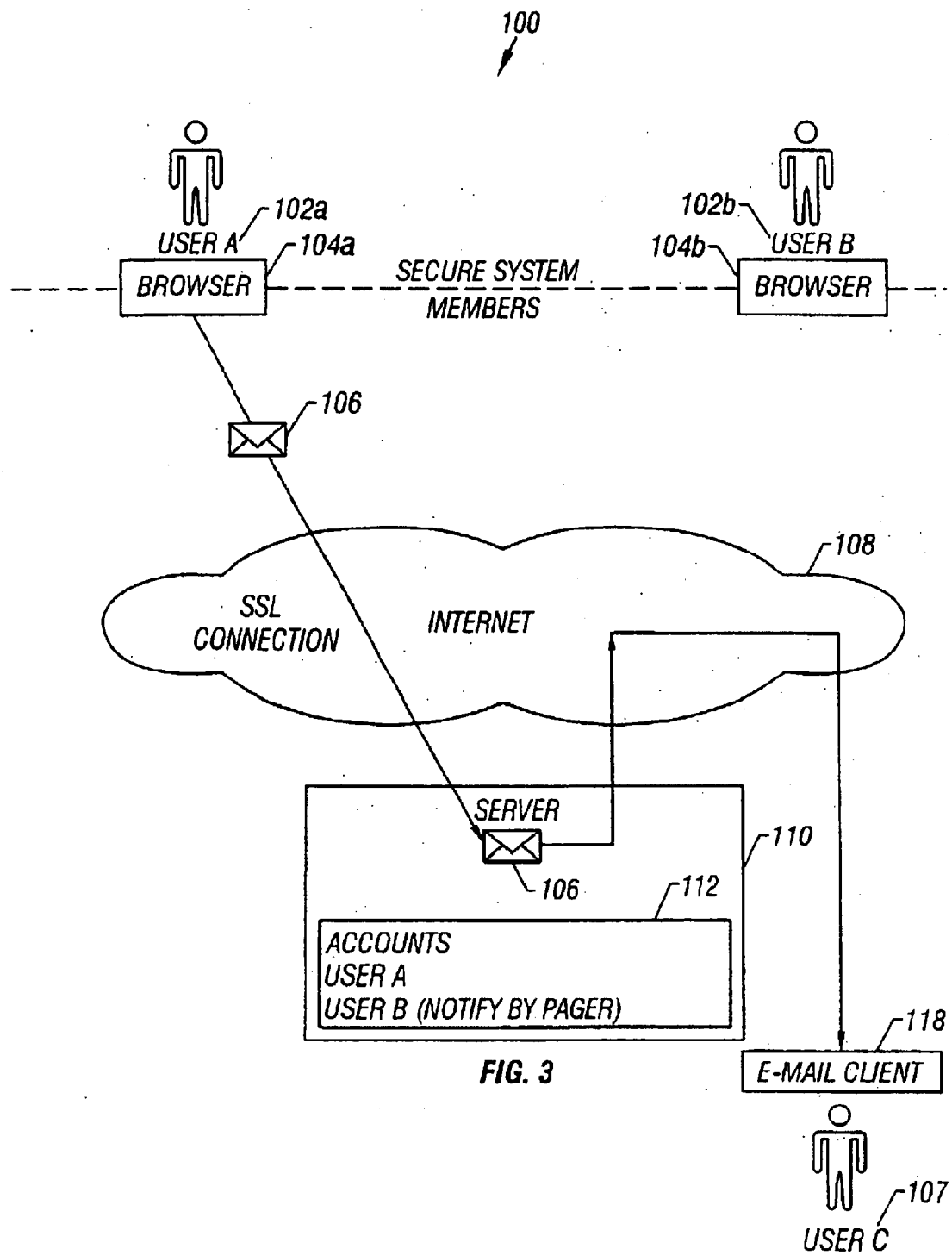

As shown in FIG. 3, the server 110 may not secure both legs of a message's trip between sender 104a and recipient 118. For example, messages sent or received by a user 107 that does not have a system account 100 may be transmitted or received using SMTP (Simple Mail Transport Protocol). While this may not provide complete "door-to-door" security for the message 106, this feature enables a user to have a single account for communication with both registered and unregistered users. That is, a system user can send mail from a single account to registered users 102a, 102b having system 100 accounts and unregistered users 107 not having system 100 accounts. Similarly, a system 100 user can tell registered and unregistered users to send mail to the same address (e.g., UserA@server.com).

Figure 4:
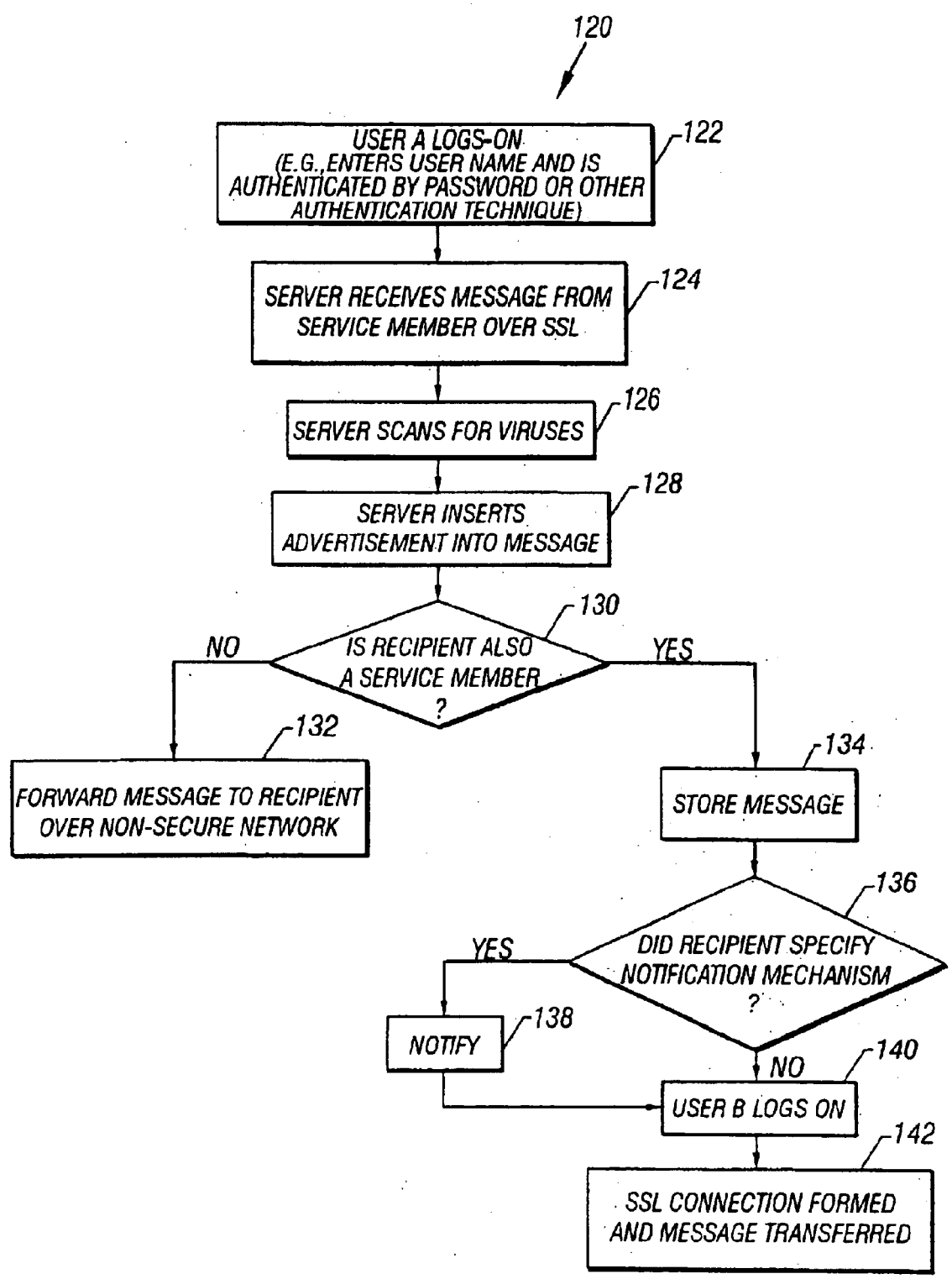
FIG. 4 is a flowchart of a process for securely handling messages.

FIG. 4 shows a process 120 a server 110 can use to provide features illustrated by FIGS. 1 to 3. After securely receiving a message 124 from a logged-on user 122, the server 110 can determine 130 if the intended recipient has an account with the server 110, for example, by trying to find an entry for the recipient in the account 112 database. If the recipient does not have an account, the server 110 can forward 132 the message to the recipient via an unsecured network connection (e.g., SMTP). If, however, the message 106 is destined for a system 100 member, the server 110 can store 134 the message, notify 136, 138 the user of the message's arrival, and securely deliver 142 the message after the recipient logs-on 140.

Because the server 110 handles messages sent and received by system users, the server 110 provides a convenient site to perform additional message processing tasks. For example, as shown in FIG. 4, the server can scan 126 received messages for viruses. Additionally, the server 110 can insert 128 advertisements into messages. For example, the server 110 can insert instructions in a message's HTML that specify a picture or URL for presentation in a browser frame. The URL may refer to a picture, banner-ad, and so forth. Such advertising can subsidize the cost of server functions.

Figure 5:
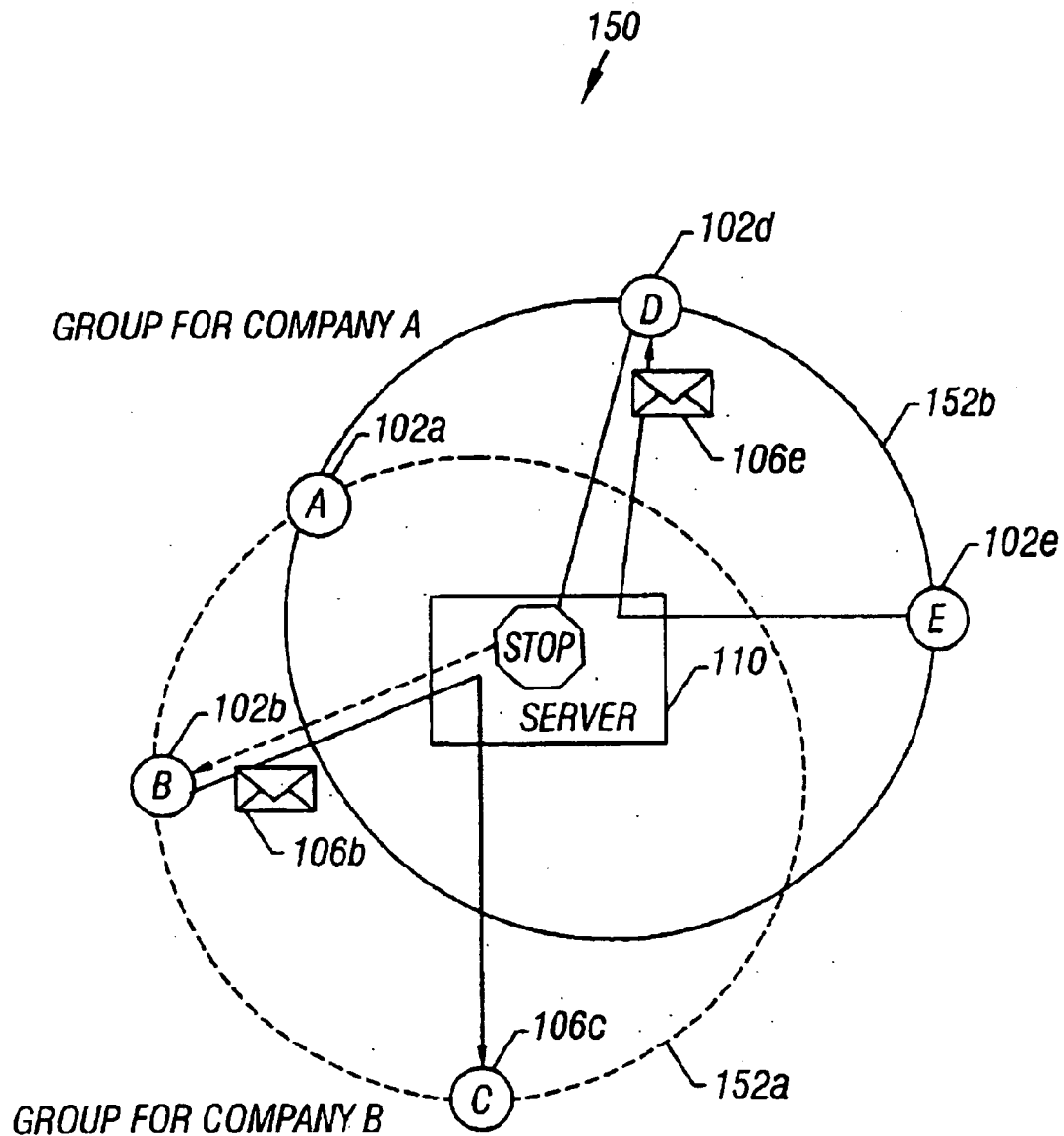
FIGS. 5 and 8 are diagrams illustrating server groups.

As shown in FIG. 5, different system users 102a–102e may belong to different groups 152a, 152b. As illustrated, users (e.g., 102a) may belong to more than one group. While FIG. 5 shows the users as belonging to groups for different companies, groups may be formed based on geography (e.g., by zip code, city, state, or country), interest, activity (e.g., college students of a particular university), services provided (e.g., software development), and so forth. Such groups may be created by users or automatically created by the server (e.g., one for each city). Users may voluntarily join a group 152a, 152b, if allowed, or may be automatically granted membership based on user characteristics.

Services provided by the server 110 may be based on group membership. For example, the server may prevent secure communication between users 102d, 102b belonging to different groups 152a, 152b. This feature essentially provides a private messaging network for companies that may not want to invest time or money in maintaining a message server, security software, etc.

Figure 6:
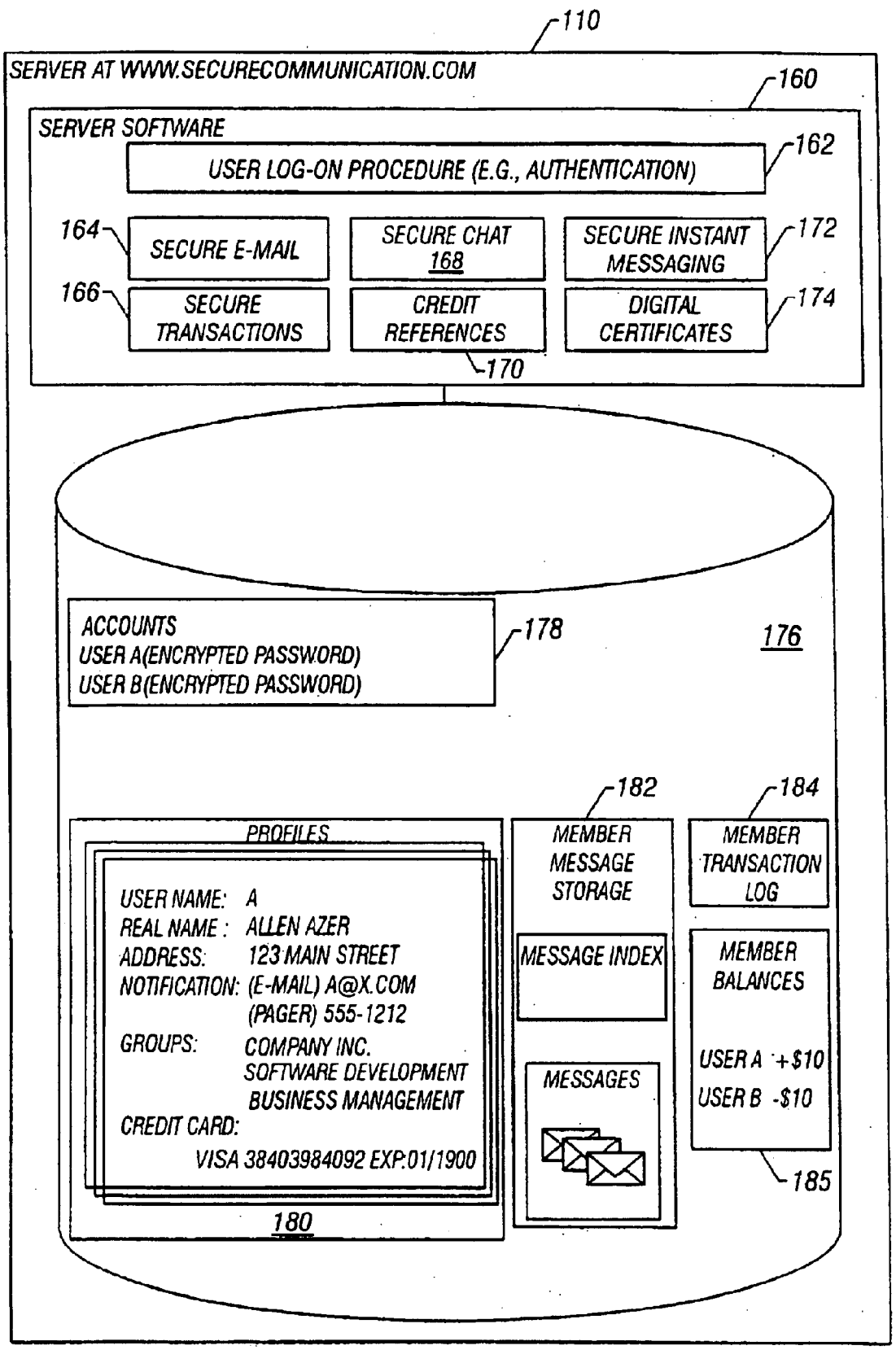
FIG. 6 is a diagram of a server.
Figure 12:
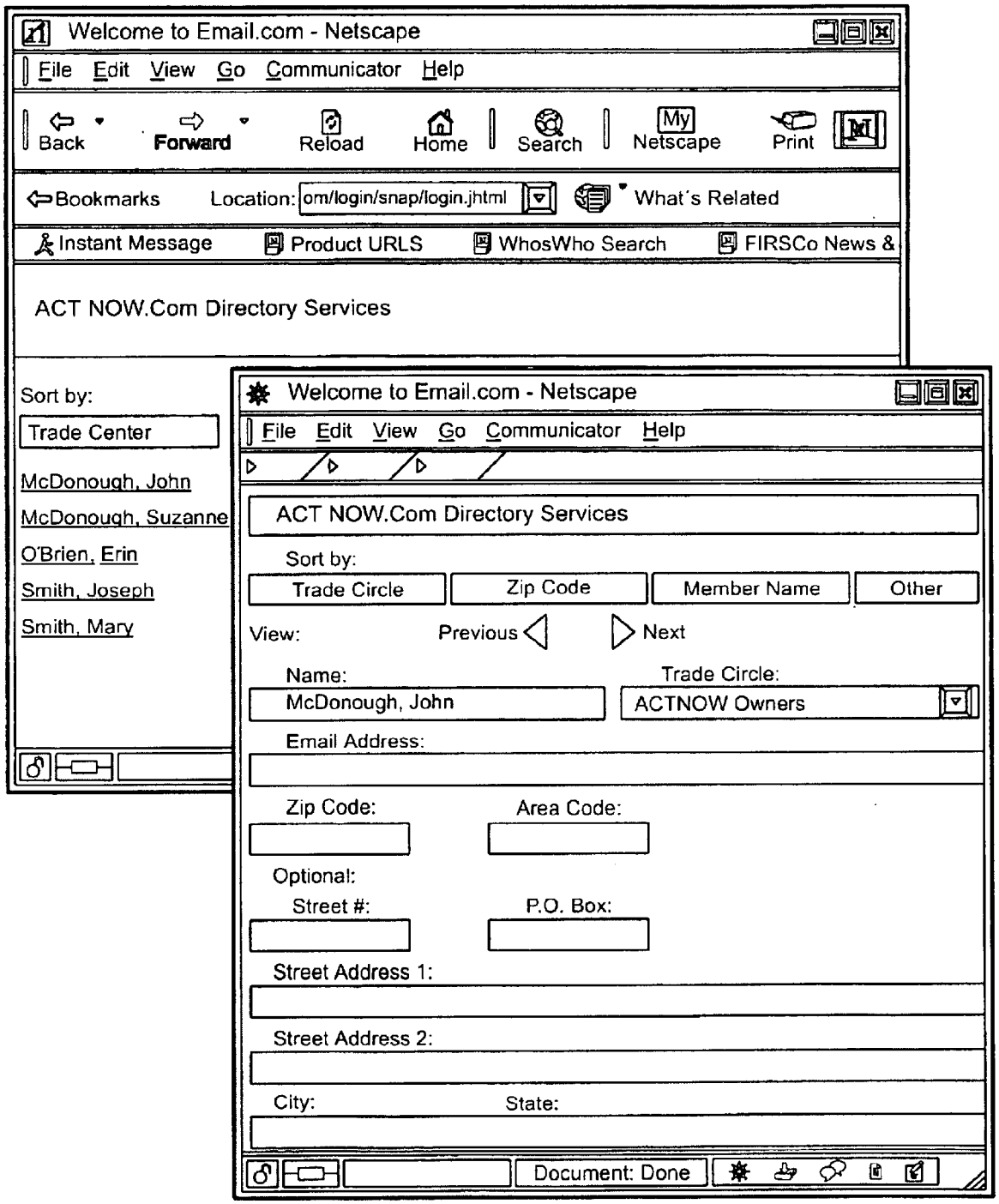
FIG. 12 is a screenshot of a directory of user profiles.

As shown in FIG. 6, the server 110 can store data 176 for user accounts. Such data 178 can include encrypted passwords for authenticating users. The server 110 may also store profiles 180. As shown, the profiles 180 can include billing, demographic information, group memberships, and other characteristics (see FIG. 11). The server 110 may, optionally, make some profile information available to other system users in a searchable directory (see FIG. 12). Additionally, the profile information 180 may be used to target information (e.g., mass e-mailings) to potentially interested users.

The server 110 also can store messages 182 awaiting delivery. Each message may be assigned an index code. A separate area of data storage may correlate index codes with particular users. The indexing scheme permits storage of messages without identification of the message recipient and, thus, offers an additional measure of security should a hacker somehow gain access to the message database.

In addition to storing data, the server 110 includes software 162–174 for providing different services. Such software may be programmed as CGI (Common Gateway Interface) scripts, Java Servlets, Server Side Java, Enterprise Java Beans, Assember, C, C++, or using other web-server programming techniques. FIG. 6 shows the server software 162–174 as discrete modules, however, the software 162–174 may be a monolithic procedure or sliced-and-diced in any number of ways. Additionally, in different embodiments the server only provides a subset of features.

As shown, the server software includes instructions 162 for logging users onto the system. The log-on procedure 162 may authenticate users, for example, by comparing a user password with a password stored in a database 178. Authentication may also include verifying user digital signatures. Once logged-on, a user can take advantage of different network services.

As shown, the server 110 can provide a variety of messaging services. Such service can include instructions 164 for handling e-mail messages and attachments. In addition to e-mail, the server can also provide real-time messaging services 168, 172. For example, the system can use the scheme shown in FIG. 1 to securely receive and deliver instant messages between system users. The instant messages may include HTML that instructs a receiving browser to immediately display the message in an "instant message" browser window.

Similarly, the server 110 can use SSL connections to provide a secure chat 168 capability. The chat 168 instructions enable system members in a chat room to broadcast messages to other chat room participants. That is, the system can establish a separate SSL connection to each of a potentially large number of chat room participants. Each chat room participant views the messages entered by the other chat room participants in real-time (e.g., in a chat room browser window or frame). Typically, a chat room message is annotated for display with an indication of the "speaking" party (e.g., "John: That's right, Bob :)"). The security provided by the system 110 can make chat rooms a good option for internal or private business meetings.

In addition to message handling, the server 110 can act as a "one-stop" network communication/e-commerce store.

For example, the server 110 can distribute 174 digital certificates and act as a certification authority. Additionally, the server 110 can include software 166 that permits system users to securely transact business with one. The server 110 can store each transaction in a log 184 and may maintain member balances 185. If a user's profile 180 includes automatic billing information (e.g., a credit card number), the server 110 can automatically debit or credit a member for transactions as they occur or after the end of a billing period. Credits or debits may accrue to a group instead of a particular member. Information about members' or groups' credit worthiness may be provided 170 to other members.

Figure 7:
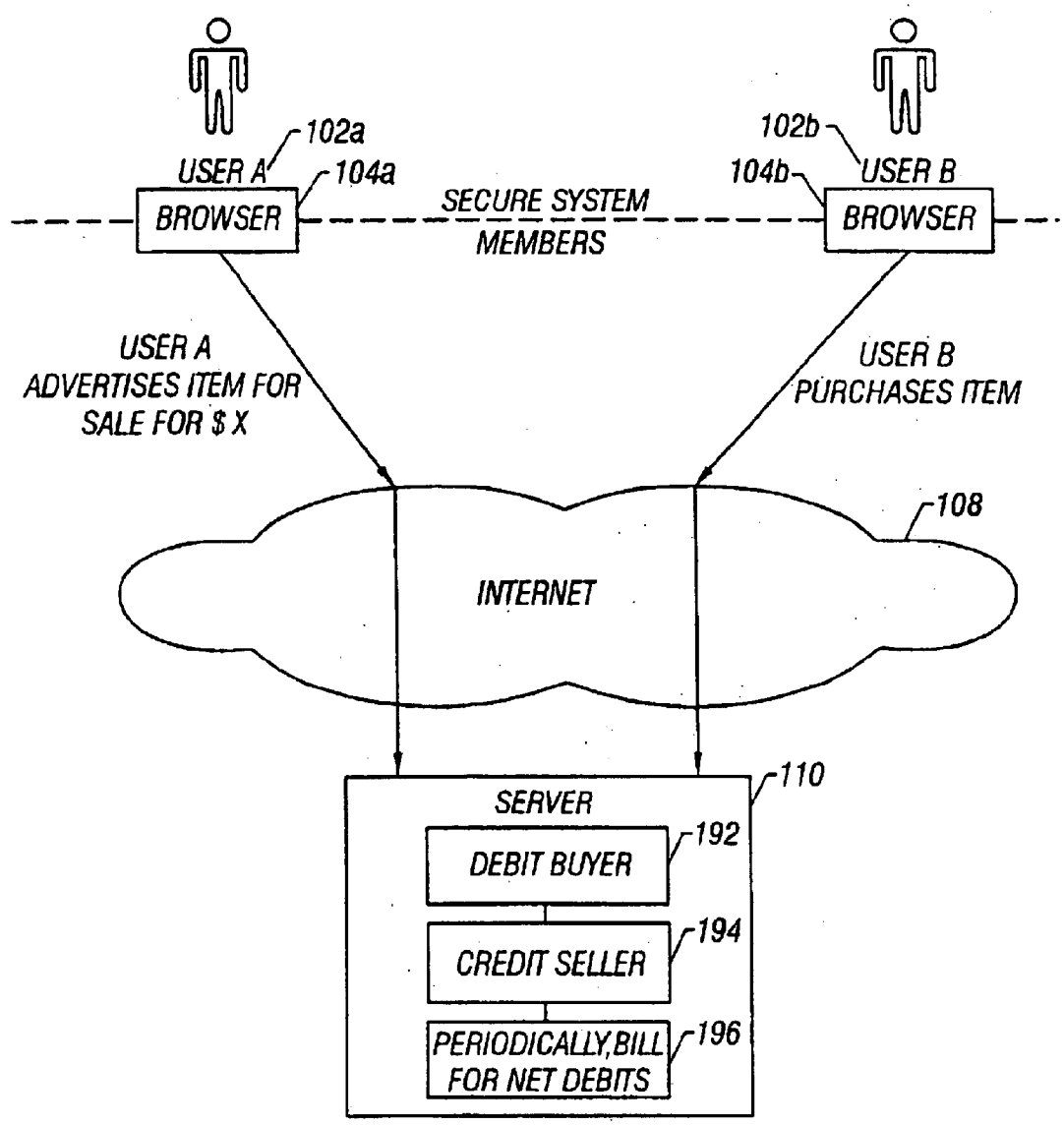
FIG. 7 is a diagram illustrating a transaction.

FIG. 7 illustrates how the server 110 can handle transactions between members. As shown, user A securely submits information describing an item for sale. The server can create an HTML page for the item by parsing the submitted information. Alternatively, an entity advertising an item for sale may create and submit their own HTML page or URL. The web-pages can be made available to other system users, for example, in a web-based catalog (e.g., www.server.com/forsale.html).

As shown, when user B securely orders the item (see FIG. 10), the server can log the transaction and adjust the buyer and seller balances 192, 194. Such adjustment can occur immediately or after the end of the billing period (e.g., once a month). Periodically, system 100 users may be billed or credited based on their balances.

By turning the server 110 into a payment-center, many businesses can enjoy e-commerce capabilities, again, without the cost or hassle associated with maintaining an Internet server. Additionally, the costs of different sophisticated server functions may be spread over a number of different companies, reducing the financial burden of providing sophisticated network services.

Figure 8:
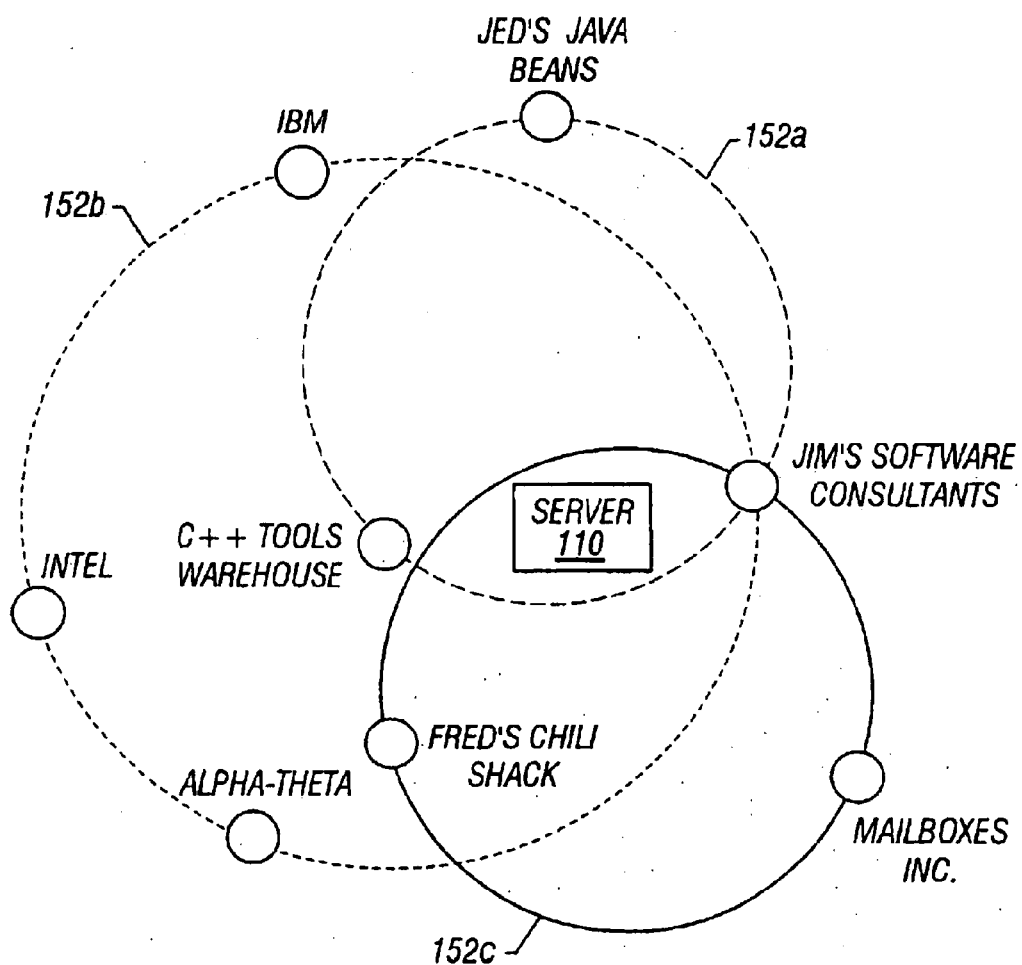

In addition to providing computing resources for e-commerce, the system can help buyers and sellers find each other. FIG. 8 shows different groups 152a–152c that can transact business using the server 110. As shown, the groups 152a–152c may overlap and may be organized using different criteria such as location, type of business, business size, and so forth. Again, this criteria may be user or system supplied.

As shown in FIG. 9, a system user can interact with a browser display 200 to find different vendors and/or potential customers. For example, as shown, a user could view businesses 212 in user selected groups 210. This enables a user to quickly whittle down a potentially large number of potential vendors, for example, by limiting the search to large, local companies. The user may also construct logical search expressions (e.g., vendors in industry A, but not in the Fortune 500) to search for vendors satisfying a particular criteria.

Figure 10:
FIG. 10 is a screenshot of a dialog for making an order.

As shown in FIG. 10, selecting a vendor causes the server to prepare a transaction browser screen 220. The server 110 can assemble the screen 220 from different sources. For example, the server 110 can generate HTML instructions that include frames 214, 216 for displaying vendor-submitted information describing items for sale. Again, the information in these frames 214, 216 may be hosted by an entity other than the server 110. For example, the contents of frame 214 may be provided by a company's web-server instead of server 110.

The display 220 may also include a server hosted "total" frame that shows the amount a particular company will be debited when the transaction completes. The description frames 212, 214 can notify the "total" frame of the web-page total via a hidden web-page field. The screen 220 may also include a frame (not shown) for displaying other advertisements (e.g., banner ads) based on user characteristics and purchase history.

EMBODIMENTS

While the description above referred to "a server", server duties may be distributed over a number of connected computers. Such computers may be networked behind a firewall.

Services may be packaged in a variety of business plans. For example, member services may be segmented into different levels. That is, members willing to have advertisements automatically appended to their messages may be able to enjoy server service for free. Additionally, members may pay for different amounts of space for message storage.

The techniques described here are not limited to any particular hardware or software configuration; they may find applicability in any computing or processing environment. The techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and one or more output devices. Program code is applied to data entered using the input device to perform the functions described and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferable stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims.

What is claimed is:

1. A method comprising receiving a message from a sender over a first secure network connection at a network server;

determining whether the message is addressed to a recipient having an associated account on the network server;

forwarding the message to the recipient over an unsecured network connection if the recipient does not have an associated account on the network server; and forwarding the message to the recipient over a second secure network connection if the recipient has an associated account on the network server.

2. The method of claim 1, wherein the secure connection comprises a connection that encrypts the message prior to transmission over the network.

3. The method of claim 2, wherein the secure connection comprises a secure sockets layer connection.

4. The method of claim 1, wherein receiving the message comprises receiving the message via a type of HTTP (HyperText Transfer Protocol).

5. The method of claim 4, wherein the type of HTTP comprises HTTPS (Hypertext Transfer Protocol Secure).

6. The method of claim 4, wherein the receiving the message via a type of HTTP-comprises receiving the message from a web-browser.

7. The method of claim 1, wherein the message comprises an HTML (HyperText Markup Language) message.

8. The method of claim 1, wherein the network comprises the Internet.

9. The method of claim 1, wherein the secure network connection is a first secure network connection, the method further comprising forwarding the message to the recipient over a second secure network connection if the recipient does have an associated account on the network server.

10. The method of claim 1, wherein the sender and recipient comprise web-browsers.

11. The method of claim 1, further comprising, storing the message using an indexing scheme without identification of the recipient; and storing a correlation of index codes to particular users in a location separate from the message.

12. A method comprising:

receiving, at a network server, an HTML (HyperText Markup Language) e-mail message over a first secure sockets layer connection with a sender, the HTML message being transmitted by the sender using a web-browser invoking HTTPS (HyperText Transfer Protocol Secure);

determining whether the message is addressed to a recipient having an associated account on the network server;

forwarding the message to the recipient over an unsecured network connection if the recipient does not have;an associated account on the network server; and forwarding the message to the recipient over a second secure sockets layer connection with the recipient if the recipient has an associated account on the network server.

13. The method of claim 12, further comprising, storing the e-mail message using an indexing scheme without identification of the recipient; and storing a correlation of index codes to particular users in a location separate from the e-mail message.

14. A computer program product, disposed on a computer readable medium, the computer program comprising instructions for causing a server to:

receive a message from a sender over a first secure network connection at a network server;

determine whether the message is addressed to a recipient having an associated account on the network server;

forward the message to the recipient over an unsecured network connection if the recipient does not have an associated account on the network server; and forward the message to the recipient over a second secure network connection if the recipient has an associated account on the network server.

* * * * *